United States Patent [19]
Tanaka et al.

[11] Patent Number: 5,553,291
[45] Date of Patent: Sep. 3, 1996

[54] VIRTUAL MACHINE CONTROL METHOD AND VIRTUAL MACHINE SYSTEM

[75] Inventors: Shunji Tanaka, Sagamihara; Hidenori Umeno, Hadano; Nobuyoshi Sugama, Chigasaki; Masaru Sato, Izumi-ku, all of Japan

[73] Assignee: Hitachi, Ltd., Tokyo, Japan

[21] Appl. No.: 120,472

[22] Filed: Sep. 14, 1993

[30] Foreign Application Priority Data

Sep. 16, 1992 [JP] Japan .................................. 4-246730

[51] Int. Cl.⁶ .................................................. G06F 9/44
[52] U.S. Cl. ........................ 395/700; 364/DIG. 1; 364/280; 364/232.1; 364/232.21; 395/406; 395/800
[58] Field of Search ........................ 395/700, 800, 395/325

[56] References Cited

U.S. PATENT DOCUMENTS

| | | | |
|---|---|---|---|
| 4,459,661 | 7/1984 | Kaneda et al. | 364/200 |
| 4,769,770 | 9/1988 | Miyadera et al. | 364/200 |
| 4,787,026 | 11/1988 | Barnes et al. | 364/200 |
| 4,812,967 | 3/1989 | Hirosawa et al. | 364/200 |
| 4,912,628 | 3/1990 | Briggs | 364/200 |
| 4,964,035 | 10/1990 | Aoyama et al. | 364/200 |
| 5,088,031 | 2/1992 | Takasaki et al. | 395/400 |
| 5,129,071 | 7/1992 | Yamagata et al. | 395/400 |

FOREIGN PATENT DOCUMENTS

| | | |
|---|---|---|
| 57-212680 | 12/1982 | Japan . |
| 64-54542 | 3/1989 | Japan . |

*Primary Examiner*—Kevin A. Kriess
*Attorney, Agent, or Firm*—Fay, Sharpe, Beall, Fagan, Minnich & McKee

[57] ABSTRACT

A virtual machine control method for a supercomputer enables a plurality of virtual machines to use a vector processor. Control of the use of the vector processor is through the scalar processor. When a virtual machine requires use of the vector processor, it is first determined whether one of the other virtual machines operating systems is using the vector processor. If not, the scalar processor is dispatched to the operating system requesting use of the vector processor. If another virtual machine operating system is using the vector processor, then the operating system requesting use of the vector processor is placed in a wait state until the vector processor becomes free, whereupon the scalar processor is dispatched to the operating system that had been in the wait state. The condition of the vector processor being free can be communicated directly to the scalar processor without the intervention of the virtual machine monitor.

33 Claims, 12 Drawing Sheets

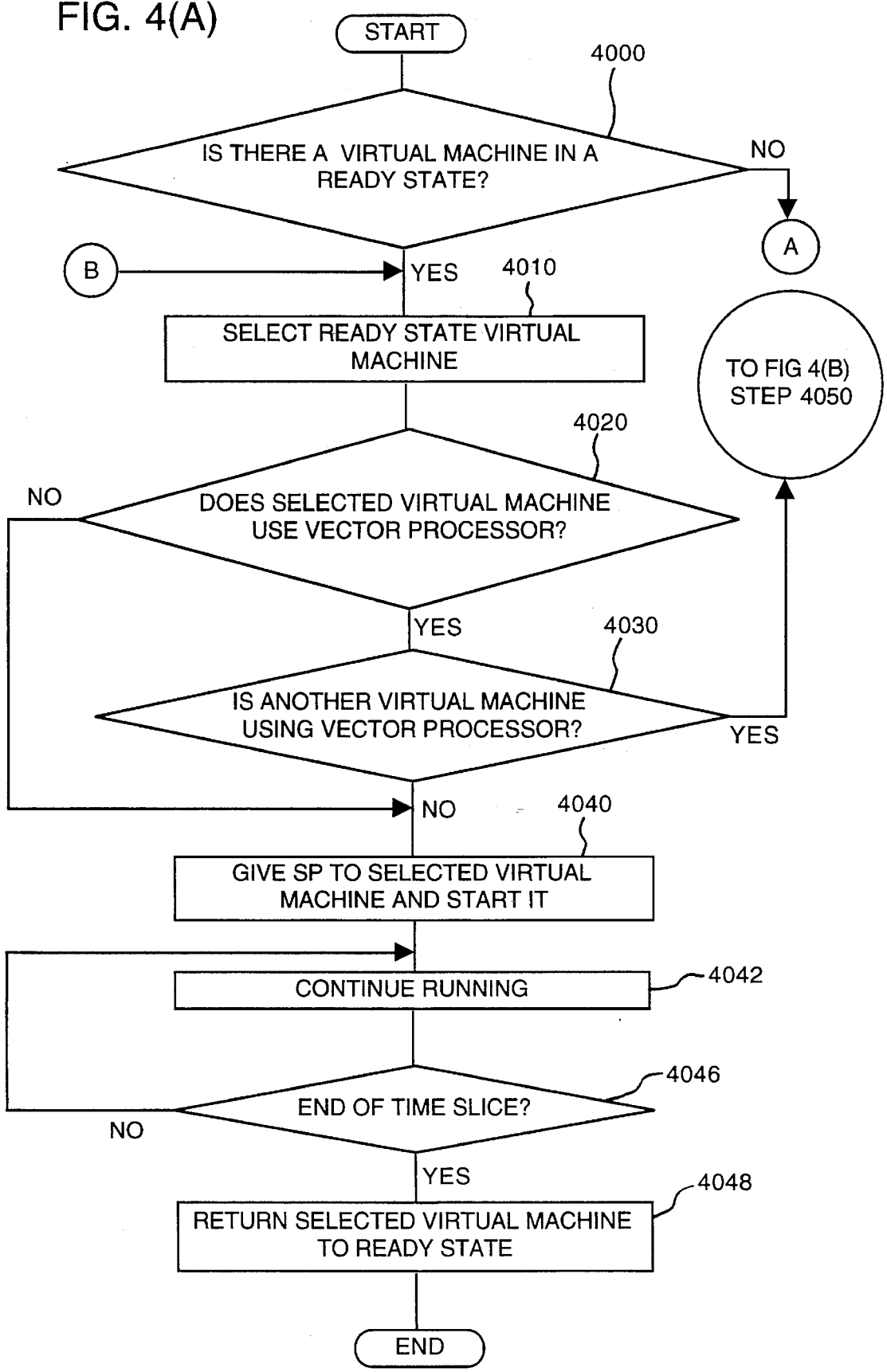

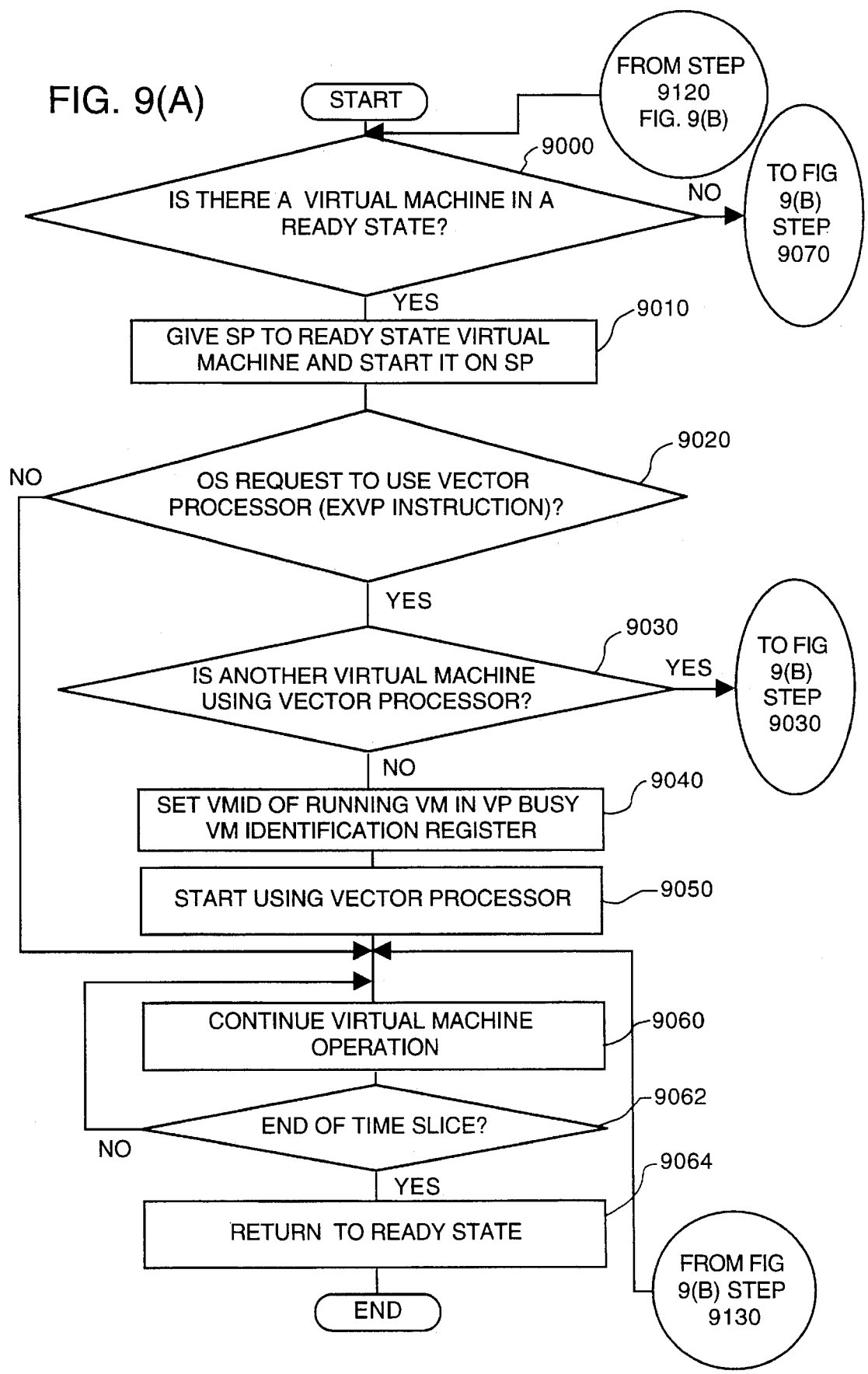

VIRTUAL MACHINE CONTROL METHOD AND VIRTUAL MACHINE SYSTEM

FIELD OF THE INVENTION

The present invention relates to a virtual machine control method, and more particularly to a virtual machine control method for enabling a plurality of virtual machines to use a second processor of a supercomputer.

BACKGROUND OF THE INVENTION

As described in published Japanese patent application no. JP-A-57-212680, a virtual machine system (VMS) generates multiple virtual machines (VM), which are logical computers, on a real computer and enables one operating system (OS) to be run for each virtual machine. In this virtual machine system, functions such as virtual machine scheduling and simulation processing of those instructions issued by a virtual machine operating system that cannot be directly executed by a real computer (hereinafter referred to simply as a "computer") are carried out by a virtual machine monitor (VMM). A virtual machine system is utilized mainly for running multiple operating systems used for different purposes on one computer. For example, both an old and a new operating system can be run on one computer by using a virtual machine system, which may occur during a transition from the old operating system to the new operating system. As another example, a virtual machine system can be used as a tool for implementing operating system tests in parallel on one computer.

Supercomputers constituted by scalar and second processors are used for high-speed scientific and technical calculations. The scalar processor activates the second processor and then performs other processing. When the second processor is activated it receives, and executes, a second job from the scalar processor. The second processor uses an interruption to communicate the termination of this second job to the scalar processor. Japanese published patent application no. JP-A-64-54542 discloses a virtual machine system in which one virtual machine (VM) has exclusive possession of a second processor (called a second unit, in the disclosure) and multiple virtual machines are able to share the scalar processor (called a scalar unit, in the disclosure).

SUMMARY OF THE INVENTION

There are the following problems in running a virtual machine system on a supercomputer and enabling a plurality of virtual machines to use the second processor.

(1) The first problem that arises when multiple virtual machines share a second processor concerns the scheduling of the virtual machines. In the prior art the second processor was used exclusively by one virtual machine so there was no particular problem with scheduling use of the second processor by the virtual machines. However, the following problem arises when multiple virtual machines attempt to share a second processor. Once a virtual machine has been created it is run for an extended period, and the virtual machine that wants to use the second processor next has to wait for an extended period of time until the termination of the virtual machine using the second processor.

(2) The second problem relates to processing the interruption used to communicate to the scalar processor that execution by the second processor has ended. One way this can be done is by having a virtual machine monitor (VMM) intervene to simulate the interruption, but this imposes an overhead that degrades the overall performance of the system.

(3) The third problem relates to the address translation process in the second processor. In the virtual machine system disclosed in JP-A-64-54542, a virtual machine that uses the second processor is assigned an exclusive region of main storage extending from a designated address to the highest address. The number of virtual machines that can use the second processor is therefore limited to one. Moreover, with a supercomputer that has a plurality of second processors, the method according to the above disclosure does not allow each of a plurality of operating systems to have exclusive use of a second processor.

An object of the present invention is to efficiently control a virtual machine system on a supercomputer having second and scalar processors.

Another object of the present invention is to provide a virtual machine scheduling method that enables multiple virtual machines to share a second processor.

A further object of the present invention is to provide an interruption execution method whereby an instruction execution termination interruption can be executed directly on the operating system of the virtual machine that activated the second processor, without the intervention of a virtual machine monitor.

A further object of the present invention is to provide an address translation method in a second processor which enables a virtual machine having an arbitrary continuous region in main storage to use a second processor.

These and other objects of the invention are achieved in accordance with a method and system represented by the following arrangement, for example.

The virtual machine system of the present invention runs multiple operating systems under the supervision of a virtual machine monitor on a computer having a first processor, and a second processor which starts instruction execution in accordance with an indication from the first processor and uses an interruption to communicate an end-of-execution to the first processor. The virtual machine control method of the present invention includes the steps of, when the virtual machine monitor starts the running of a first operating system, determining whether or not a second operating system is using the second processor. If so, the running of the first operating system is put on hold, and if not, the first operating system is provided with the first processor and the second processor for starting the running thereof.

The virtual machine system according to the present invention runs multiple operating systems under the supervision of a virtual machine monitor on a computer having a first processor, and a second processor which starts instruction execution in accordance with an indication from the first processor and uses an interruption to communicate an end-of-execution to the first processor. The virtual machine system in one embodiment includes scheduling means for determining how to allocate the first and second processors to the multiple operating systems, means provided in the second processor for storing mapping information that defines the memory address correspondence between main memory of the multiple operating systems and main storage of the computer, means for transferring to the second processor an identification of an operating system running on the first processor in accordance with the scheduling by the scheduling means, selection means that, when there is a request from the second processor to access the main memory of an operating system, uses operating system identification information sent from the first processor to select the main memory mapping information of the operating system concerned, and translation means that in accordance with the selected mapping information translates the address of the operating system main memory to which access is requested for a corresponding main storage address.

Implementation of the present invention on a computer having a scalar processor as the first processor and a second processor as the second processor is as follows.

(1) In a virtual machine system running multiple operating systems on a supercomputer having scalar and second processors, the virtual machine monitor schedules the virtual machines as follows. First it is determined whether or not the second processor is being used by a second operating system that is other than the first operating system which is to be run. If the second processor is being used by a second operating system, the operation of the first operating system is put on hold. When the second operating system finishes using the second processor the virtual machine monitor reschedules the first operating system. Also, when the second processor is not being used by any operating system or is being used by the first operating system itself, the scalar processor and second processor are both given to the first operating system and the first operating system is started.

Thus, at the point at which the first operating system is started the second processor is either free or is being used by the first operating system itself. Also, the second processor is only activated by an instruction issued by the scalar processor. As such, there is no activation of the second processor by another operating system while the first operating system is running on the scalar processor.

Also provided is another method in accordance with which the scalar processor is given to the first operating system regardless of whether the second processor is busy or not, and when there is a request to use the second processor it is determined whether or not the second processor is busy.

Thus, as described above, a virtual machine scheduling method can be provided that enables multiple virtual machine operating systems to share the second processor.

(2) In a virtual machine system running multiple operating systems on a supercomputer having scalar and second processors, when the second processor finishes instruction execution, an interruption for the operating system that used the second processor is put on hold. The interruption is executed later at a point at which the operating system running on the scalar processor can be interrupted. By thus holding an interruption for each operating system, the second processor end of execution interruption can be executed without the intervention of the virtual machine monitor. This makes it possible to decrease the overhead that accompanies the intervention of the virtual machine monitor.

(3) In a virtual machine system running multiple operating systems on a supercomputer having scalar and second processors, the virtual machine monitor provides each of the virtual machines beforehand with a continuous region in the main storage of a real computer. First, memory address mapping information between the main memory of multiple operating systems and main storage on a real computer is registered in the second processor by the virtual machine monitor. When a virtual machine operating system in the scalar processor requests the second processor, the identification of that operating system is sent from the scalar processor to the second processor. When there is a request by the second processor to access operating system main memory, the memory address mapping information of the operating system concerned is selected from the said operating system identification. The second processor then uses the selected memory address mapping information to translate the main memory address of the operating system to which access has been requested, to an address in the main storage of the real computer. The address obtained by this translation is then used to access the real computer main storage area corresponding to the main memory area of that operating system.

In accordance with the above, virtual machines that have been allocated an arbitrary continuous region of the main storage of a real computer are able to utilize a second processor.

BRIEF DESCRIPTION OF THE DRAWINGS

FIGS. 4(A) and 4(B) taken together are a flow chart of the first embodiment scheduling method.

FIGS. 9(A) and 9(B) taken together are a flow chart of the third embodiment scheduling method.

1. Supercomputer configuration

Figure 1:
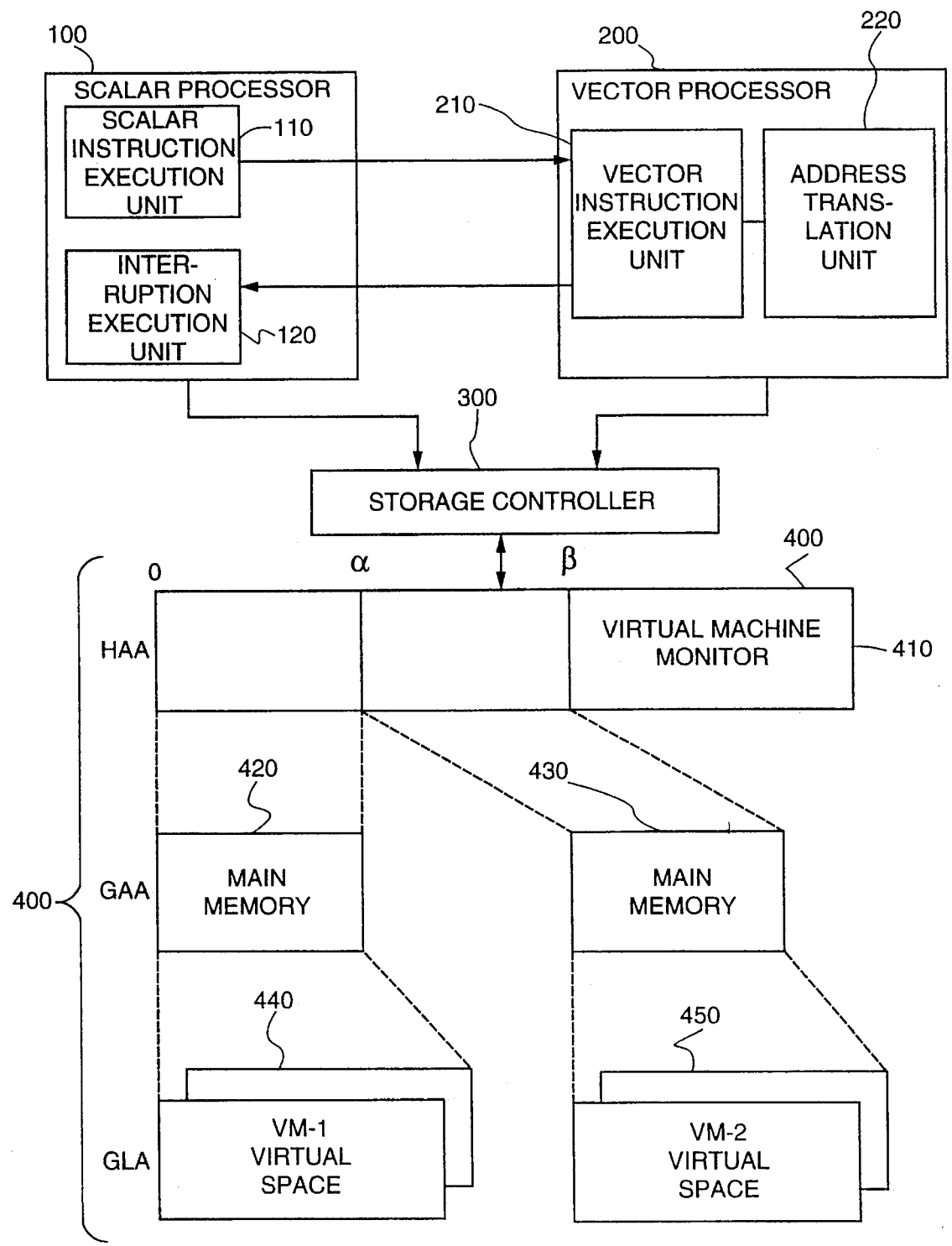
FIG. 1 is a schematic diagram of a system embodiment of the present invention implemented on a supercomputer.

FIG. 1 is a block diagram of a virtual machine system (VMS) of the present invention implemented with a supercomputer. In the drawing, 100 is a scalar processor (SP) that performs scalar processing, 200 is a second processor (VP) that performs second processing, and 300 is a storage controller (SC) that references or refreshes main storage (MS) 400 in accordance with instructions from the scalar processor 100 or second processor 200.

The scalar processor 100 is provided with a scalar instruction execution circuit 110 and an interruption execution circuit 120. Also, the second processor 200 is provided with a second instruction execution circuit 210 and an address translation circuit 220. When the scalar instruction execution circuit 110 in the scalar processor 100 executes an EXVP (Execute Second Processor) instruction, the second instruction execution circuit 210 starts executing second instructions in the main storage 400. Also, termination of the execution of the second instructions by the second instruction execution circuit 210 is intercepted by the interruption execution circuit 120 in the scalar processor 100. For controlling the second processor 200, in addition to the EXVP instruction the scalar processor 100 is also provided with a TVP (Test Second Processor) instruction to determine whether or not the second processor 200 is busy.

Arranged on the main storage 400 is a virtual machine monitor (VMM) 410 that performs virtual machine (VM) scheduling and the like. The main memory 420 of virtual machine (VM-1) resides in a region of the main storage 400 extending from address 0 up to, but not including, address α, while the main memory 430 of virtual machine (VM-2) resides in a region extending from address α up to, but not including, address β. To differentiate the virtual machine main memories 420 and 430, main storage 400 is referred to as real computer main storage. The address translation circuit 220 translates a logical address (guest logical address: GLA) designated by second instructions in virtual spaces 440 and 450 (indicated in the drawing as Multiple Virtual Space), created by the operating systems on the virtual machines, to an absolute address (guest absolute address: GAA) in virtual machine main memory, and, furthermore, translates this guest absolute address to an absolute address (host absolute address: HAA) in the main storage 400. The virtual machine monitor 410 performs virtual machine scheduling to enable multiple virtual machines to use the second processor 200. Also, the end of execution interruption of the second processor 200 can be directly executed on the operating system that activated the second processor 200, by the interruption execution circuit 120, without the intervention of the virtual machine monitor 410.

When virtual machines are created, each is given an attribute indicating whether or not it uses the second processor 200. That is, a virtual machine that has an attribute indicating that it uses the second processor 200 will have a virtual machine configuration with a second processor, and a supercomputer operating system will operate under that virtual machine. Also, a virtual machine that has an attribute indicating non-use of the second processor 200 will have a virtual machine configuration that does not have a second processor, and a general-purpose computer operating system will operate under that virtual machine.

One example of address translation processing in the second processor 200, three examples relating to virtual machine scheduling methods and one example of a method of processing an end-of-execution interruption by the second processor 200 will now be described in detail with reference to the respective drawings.

2. Address translation in the second processor

Figure 2:
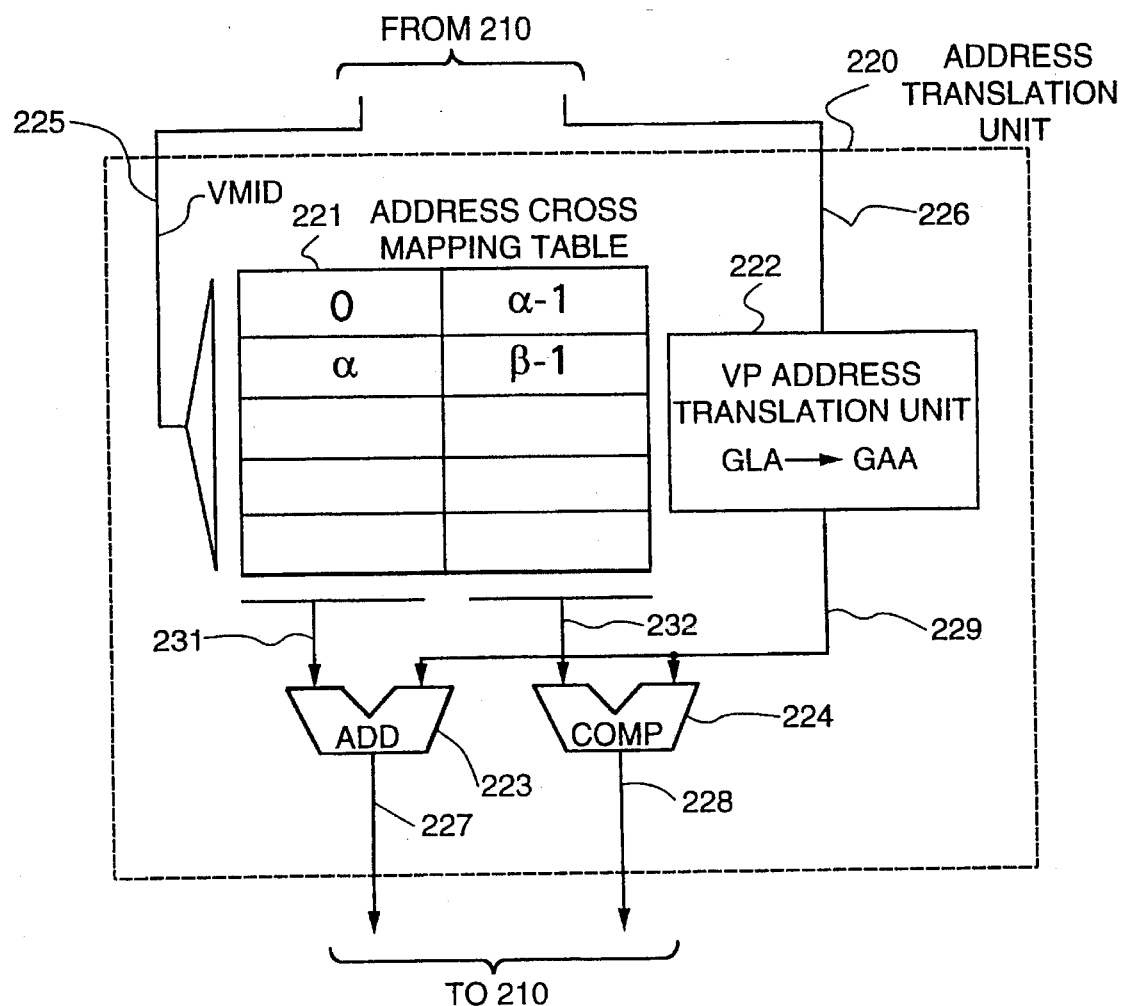
FIG. 2 is a schematic diagram of the address translation circuit shown in FIG. 1.

FIG. 2 shows details of the configuration of the address translation unit 220 shown in FIG. 1. In FIG. 2, an address cross-mapping table 221 provided in accordance with the present invention holds the starting address and end address of the virtual machine main memory in the main storage 400. For example, the first entry in the address cross-mapping table 221 shows that the region from address 0 to address α (not including address α) in the main storage 400 is the main memory 420 of VM-1, and the second entry shows that the region from address α to address β (not including address β) in the main storage 400 is the main memory 430 of VM-2. The address cross-mapping table 221 may be established with the scalar instructions used when the virtual machine monitor 410 creates a virtual machine. A logical address (guest logical address) 226 in the virtual space of a virtual machine, designated by second instructions, is translated to an absolute address (guest absolute address) 229 in virtual machine main memory by a VP address translation circuit of unit 222. The address translation unit 220 is also provided with an adder (ADD) 223 and comparator (COMP) 224.

The second instruction execution circuit 210 inputs to the address translation unit 220 a VMID signal 225 that indicates the identification of the virtual machine that issued the instruction to execute the second instructions. This VMID is the VMID of the virtual machine that was running on the scalar processor 100 when the EXVP instruction to activate the second processor 200 was executed by the scalar instruction execution unit 110. Based on this VMID, the address translation unit 220 selects a starting address 231 and end address 232 in the main storage 400 main memory of the virtual machine that issued the instruction to execute the second instructions from the address cross-mapping table 221. In the VP address translation circuit 222 the guest logical address 226 input from the second instruction execution circuit 210 is converted to a guest absolute address 229. This guest absolute address 229 is then output as host absolute address 227 to which the starting address 231 has been added by the adder (ADD) 223. The second instruction execution circuit 210 uses this output to execute the second instruction.

However, when the result of the determination by the comparator 224 is that the guest absolute address 229 is larger than the end address 232 (indicating that guest absolute address 229 is outside the main memory area of the virtual machine), an interruption signal 228 is output to the second instruction execution circuit 210. This forms a check mechanism to ensure that the main memory contents of the other virtual machine are not destroyed. When the second instruction execution circuit 210 receives the interruption signal 228, the second instruction execution circuit 210 halts execution of the second instructions and sends an interruption signal to the interruption execution circuit 120 in the scalar processor 100.

In accordance with the above procedure, address translation in the second processor 200 enables virtual machines having an arbitrary continuous region of the main storage 400 to use the second processor 200.

Figure 3:
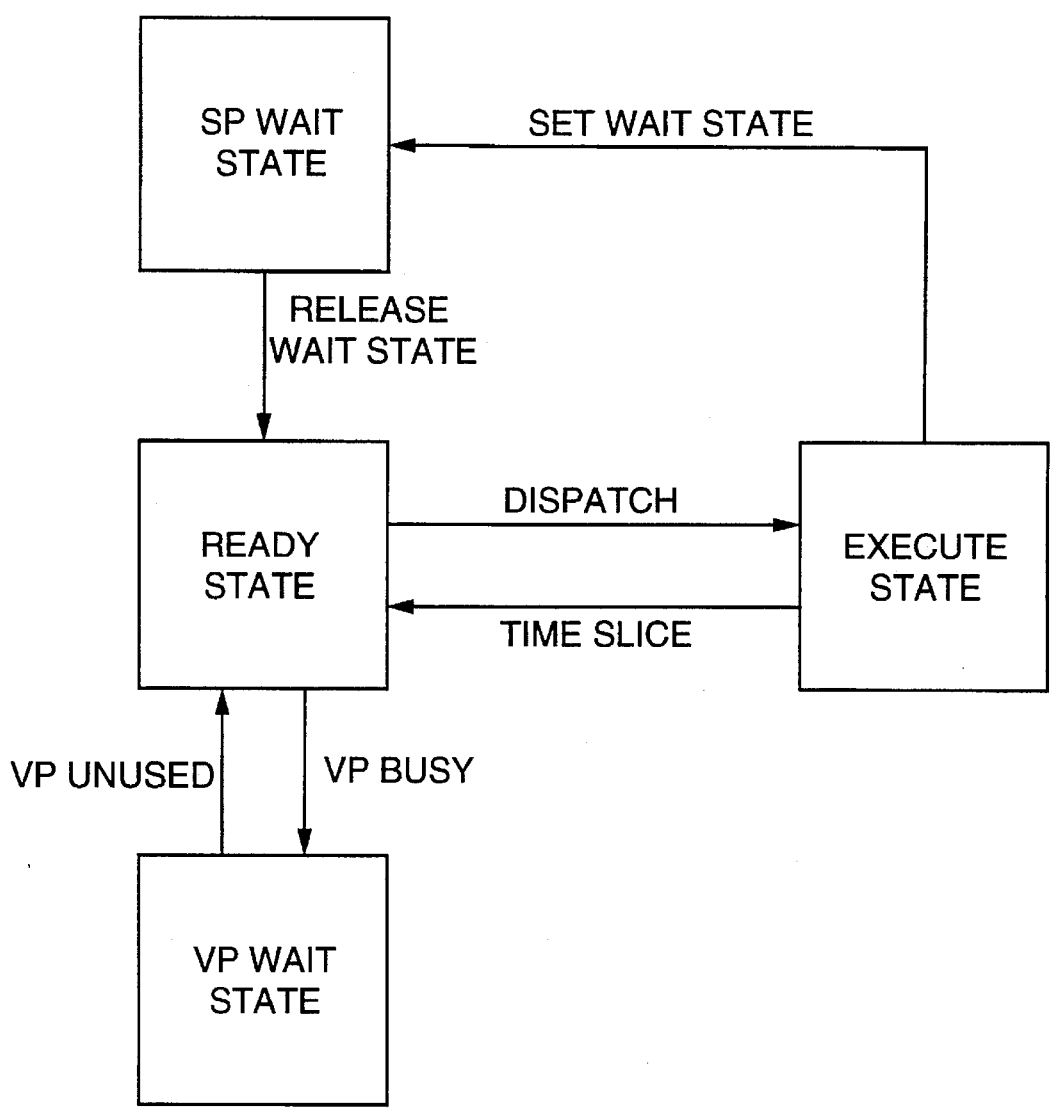
FIG. 3 is an explanatory diagram of state transitions in a scheduling method of a first embodiment of the invention.

3. Embodiments of virtual machine scheduling method 3.1 First embodiment scheduling method Virtual machine scheduling state transitions will now be described, first with reference to FIG. 3. In accordance with the first scheduling method, under the virtual machine monitor 410 there are four virtual machine scheduling states, which are a scalar processor wait state (SP wait state), a ready state, an execute state, and a second processor wait state (VP wait state). Only a virtual machine in an execute state can start executing second processor 200 instructions in accordance with an EXVP instruction of the scalar processor 100.

When an SP wait state is released by the virtual machine monitor 410 as a result of an interruption or suchlike simulation performed with respect to a virtual machine, the virtual machine assumes a ready state. In accordance with sequence dispatching by the virtual machine monitor 410, a ready state virtual machine assumes an execute state. Dispatching means giving the scalar processor to the operating system of the designated virtual machine. In the execute state, when the operating system running on the virtual machine issues a wait state set instruction the virtual machine assumes an SP wait state. On the other hand, when in the execute state a time slice (a predetermined small time period) elapses the virtual machine reverts to a ready state. This is to implement sequential operation of multiple virtual machines on a time sharing basis. Moreover, when the virtual machine monitor 410 detects that the second processor 200 is busy, a virtual machine VM that has a second processor 200 use attribute and is not presently using the second processor 200 is changed to a VP ready state to avoid conflict over use of second processor 200. When the second processor 200 assumes a free state these wait state virtual machines VM revert to a ready state. However, virtual machines that are in a ready state and have a second processor 200 non-use attribute do not shift to a VP wait state. This is to ensure that even when dispatching is used to put this virtual machine into an execute state, a virtual machine that is using the second processor 200 will not be affected and, also, a virtual machine that is not able to use the second processor 200 will not be affected by a virtual machine that is using the second processor 200.

Figure 4B:
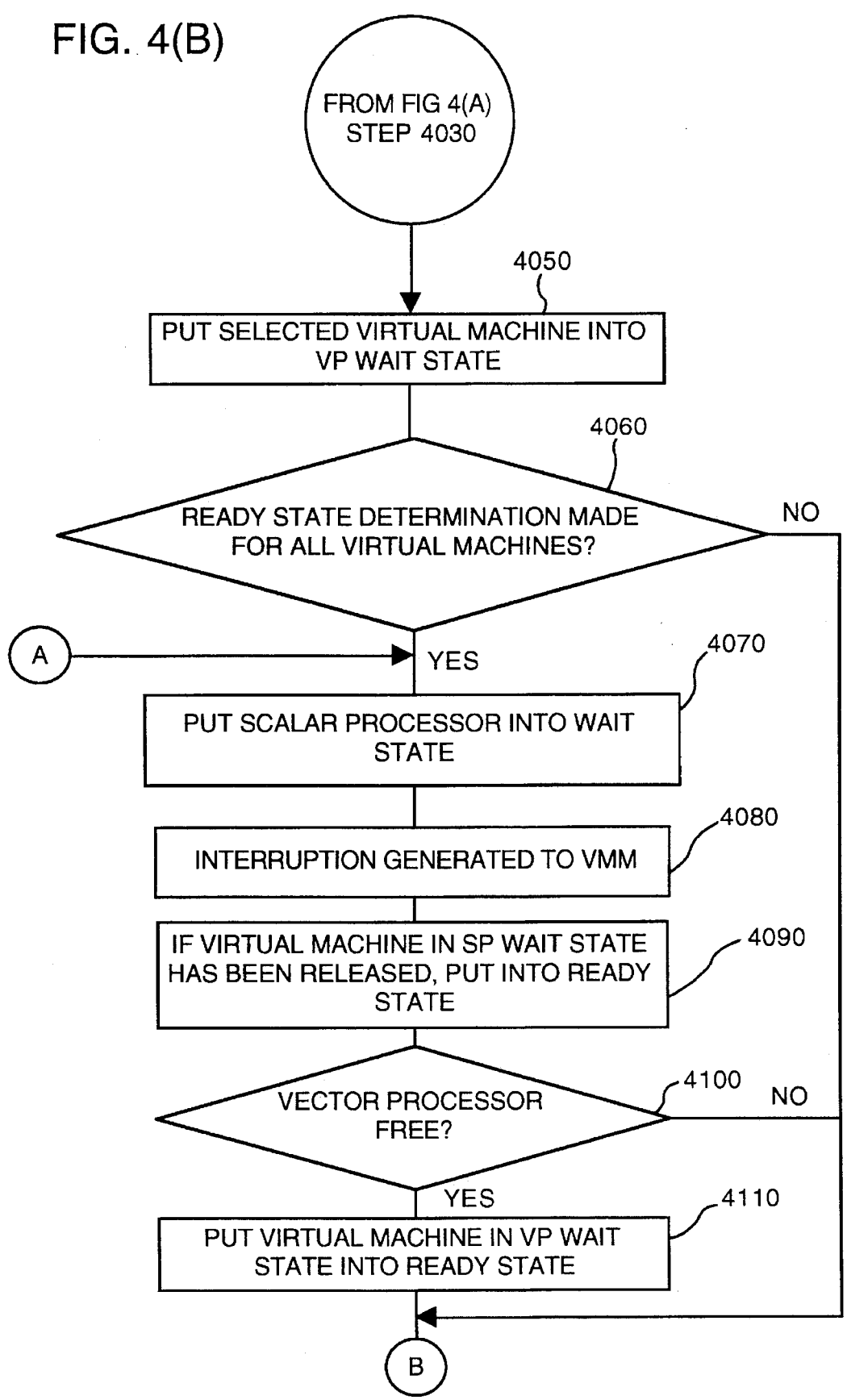

A first virtual machine scheduling method by the virtual machine monitor 410 will now be described with reference to the flow chart of FIG. 4.

The virtual machine monitor 410 first determines whether or not there is a virtual machine in a ready state (Step 4000), and if there is not puts the scalar processor 100 into a wait state (Step 4070). If there is a virtual machine in a ready state, ready state virtual machine selection is carried out in accordance with a dispatching cue (Step 4010), and it is determined whether or not the selected virtual machine has a second processor 200 use attribute (Step 4020). In the absence of a use attribute the selected virtual machine is started on the scalar processor 100 (Step 4040). If during the running of the virtual machine (Step 4042) a time slice ends (Step 4046), the virtual machine concerned is returned to the ready state (Step 4048).

In Step 4020, when the selected virtual machine has a second processor 200 use attribute the virtual machine monitor 410 executes the TVP (Test Second Processor) instruction and determines whether or not second processor 200 is being used by another virtual machine (Step 4030), and if it is not, the selected virtual machine is started on the scalar processor 100 (Step 4040).

With this scheduling method dispatching is implemented to give the scalar processor 100 and second processor 200 to the same virtual machine. Therefore if the TVP instruction is executed and second processor 200 is busy, it is established that of the virtual machines that have been given a second processor 200 use attribute, the virtual machine most recently dispatched by the virtual machine monitor 410 is using the second processor 200.

Virtual machine operation on the scalar processor 100 is effected in accordance with the SIE (Start Interpretive Execution) instruction described below. The operating system on this virtual machine is able to use the second processor 200 and scalar instruction execution circuit 110 and can directly execute an EXVP instruction issued by the operating system without applying an interruption (simulated by the virtual machine monitor 410) to the virtual machine monitor 410.

When in Step 4030 it is determined that the second processor 200 is being used by another virtual machine, the virtual machine monitor 410 holds the operation of the selected virtual machine on the scalar processor 100 as a VP wait state (Step 4050). It is checked whether the above determination has been made with respect to all virtual machines (Step 4060), and if some remain, process execution returns to Step 4010 and the virtual machine to be run is again selected. When the determination of the ready state has been completed for all virtual machines, the virtual machine monitor 410 puts scalar processor 100 into an SP wait state (Step 4070). Following this, if a designated virtual machine is released from the SP wait state by the generation of an interruption (Step 4080) from an input/output device or the like to the virtual machine monitor 410, the virtual machine goes from an SP wait state to a ready state (Step 4090). Then, the virtual machine monitor 410 uses the TVP instruction to determine whether, owing to the above interruption, second processor 200 has assumed a free state (Step 4100). If it has not, the execution again goes to Step 4010 and the virtual machine to be run is selected. If it has assumed a free state, the virtual machine monitor 410 puts virtual machines in a VP wait state into a ready state, moves execution to Step 4010 and selects the virtual machine to be run.

Thus, in the first scheduling method, at the point at which a selected virtual machine starts to run on the scalar processor 100, the second processor 200 is not being used by either of the virtual machines or is being used by the selected virtual machine itself. The second processor 200 is activated only by an EXVP instruction executed by the scalar processor 100. Therefore, while a virtual machine is running on the scalar processor 100 no second instructions are executed by another virtual machine. Therefore it becomes possible for the virtual machine running on the scalar processor 100 to use the second processor 200.

3.2 Second embodiment scheduling method

Figure 6:
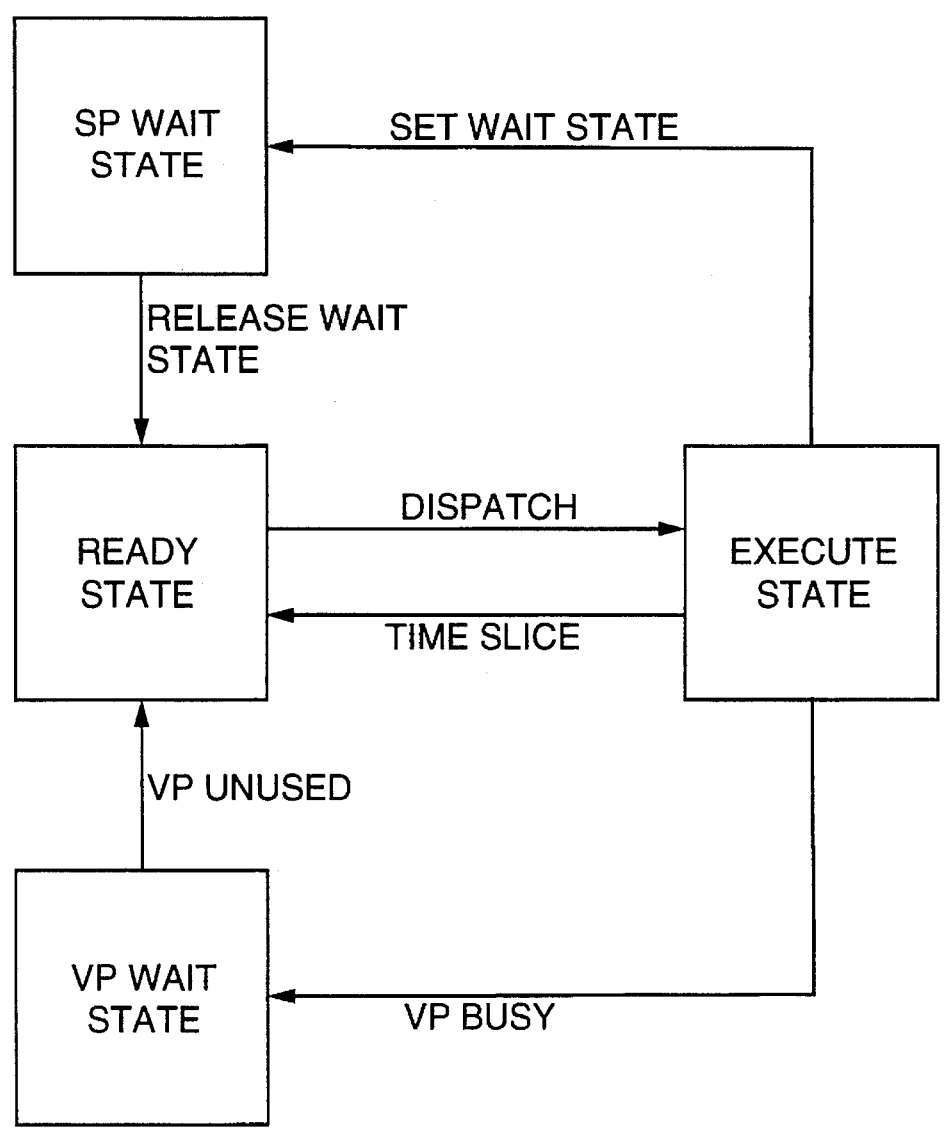
FIG. 6 is an explanatory diagram of state transitions in a scheduling method of a second embodiment of the invention.

Virtual machine scheduling state transitions will now be described with reference to FIG. 6. In the second scheduling method, as in the first scheduling method, under the virtual machine monitor 410 there are four virtual machine scheduling states, which are a scalar processor wait state (SP wait state), a ready state, an execute state, and a second processor wait state (VP wait state). While the transitions are the same as the state transitions of the first scheduling method, these four states differ in the following points.

(a) In accordance with the first scheduling method, when the virtual machine monitor 410 detects that the second processor 200 is busy, a virtual machine that is in a ready state and is able to use the second processor 200 and is not presently using the second processor 200 is changed to a VP wait state. In accordance with this second scheduling method, however, regardless of other conditions, a virtual machine in a ready state is given the scalar processor and put into an execute state, and when this execute state virtual machine moves to use the second processor 200, it is determined whether or not another virtual machine is using the second processor 200. If another virtual machine is using the second processor 200 the execute state is suspended and the virtual machine monitor 410 puts the suspended virtual machine into a VP wait state. Thus, the difference is that in the first scheduling method there is a transition from a ready state to a VP wait state, while in the case of this second scheduling method the transition is from the execute state to the VP wait state.

Figure 5:
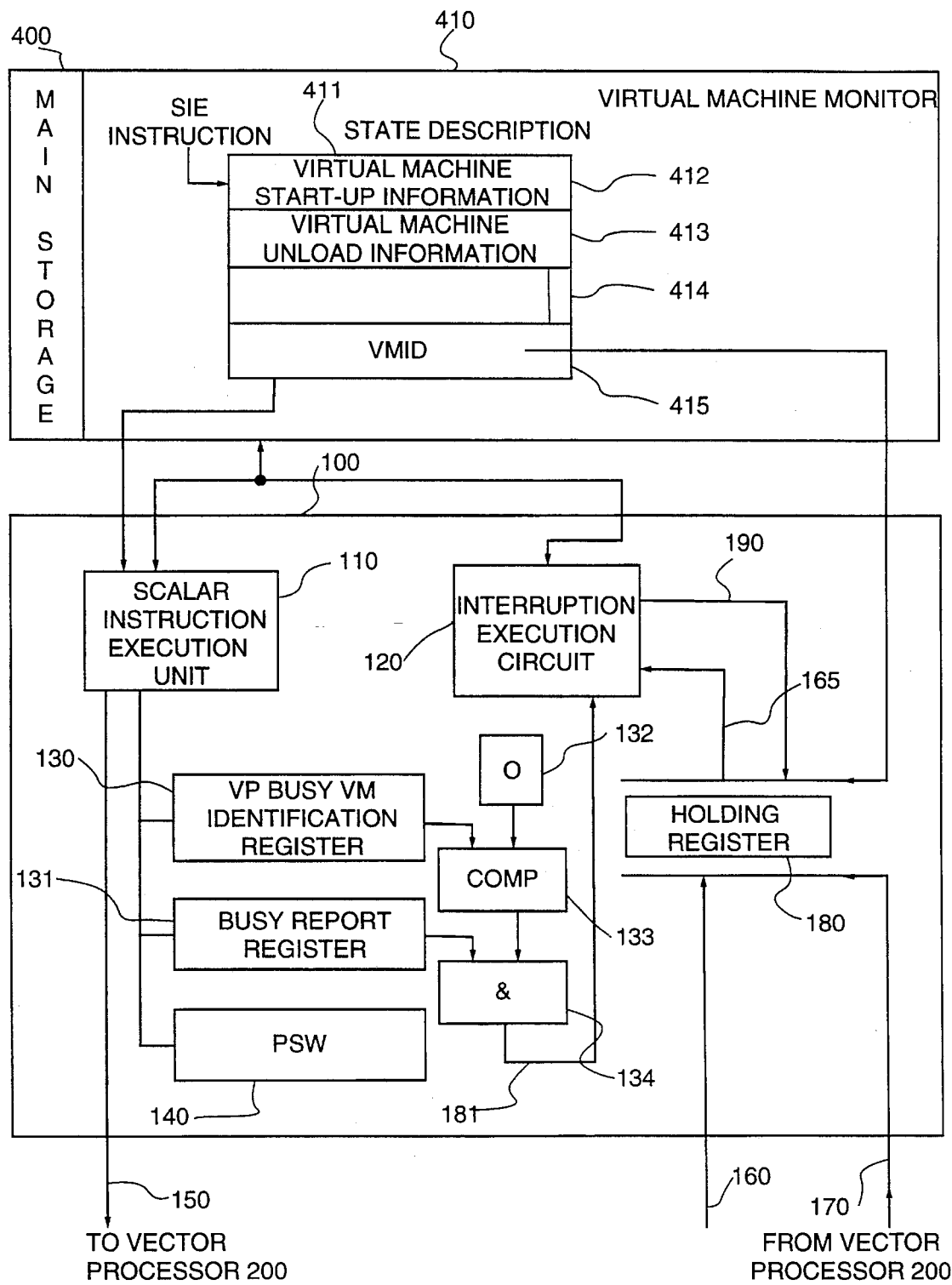
FIG. 5 is a schematic diagram of the scalar processor shown in FIG. 1.

The second scheduling method and the arrangement of the scalar processor 100 used in the following explanation will now be described, with reference to FIG. 5. In addition to the scalar instruction execution circuit 110 and interruption execution circuit 120, the scalar processor 100 has a VP busy VM identification register 130 that holds the identification of the virtual machine (OS) that is using the second processor 200, a busy report register 131 in which a "1" is loaded when a VP busy signal has been communicated to the operating system (OS), a PSW register 140 that holds the contents of a virtual machine program status word (PSW: Program Status Word), a register 132 which always contains "0" a comparator 133 that compares register 130 and register 132, an AND circuit 134 that obtains the logical product (AND) of the output of comparator 133 and the value of busy report register 131, and a holding register 180 for holding the second processor 200 end-of-execution interruption.

As mentioned, SIE instructions are used to run a virtual machine on the scalar processor 100. The state description (SD) that forms the operand of the SIE instruction has a virtual machine start-up information 412 region, a virtual machine unload information 413 region, a busy report bit 414 region and a virtual machine identification (VMID) 415 region. When the virtual machine monitor 410 executes an SIE instruction the contents of the virtual machine program status word PSW contained in the virtual machine start-up information 412 are loaded into the PSW register 140 in the scalar processor 100 and the value of the busy report bit 414 is loaded into the busy report register 131, by the scalar instruction execution circuit 110. Following this, the scalar instruction execution circuit 110 executes the instruction in the main memory of the virtual machine indicated in the instruction address field that forms part of the program status word.

Figure 7A:
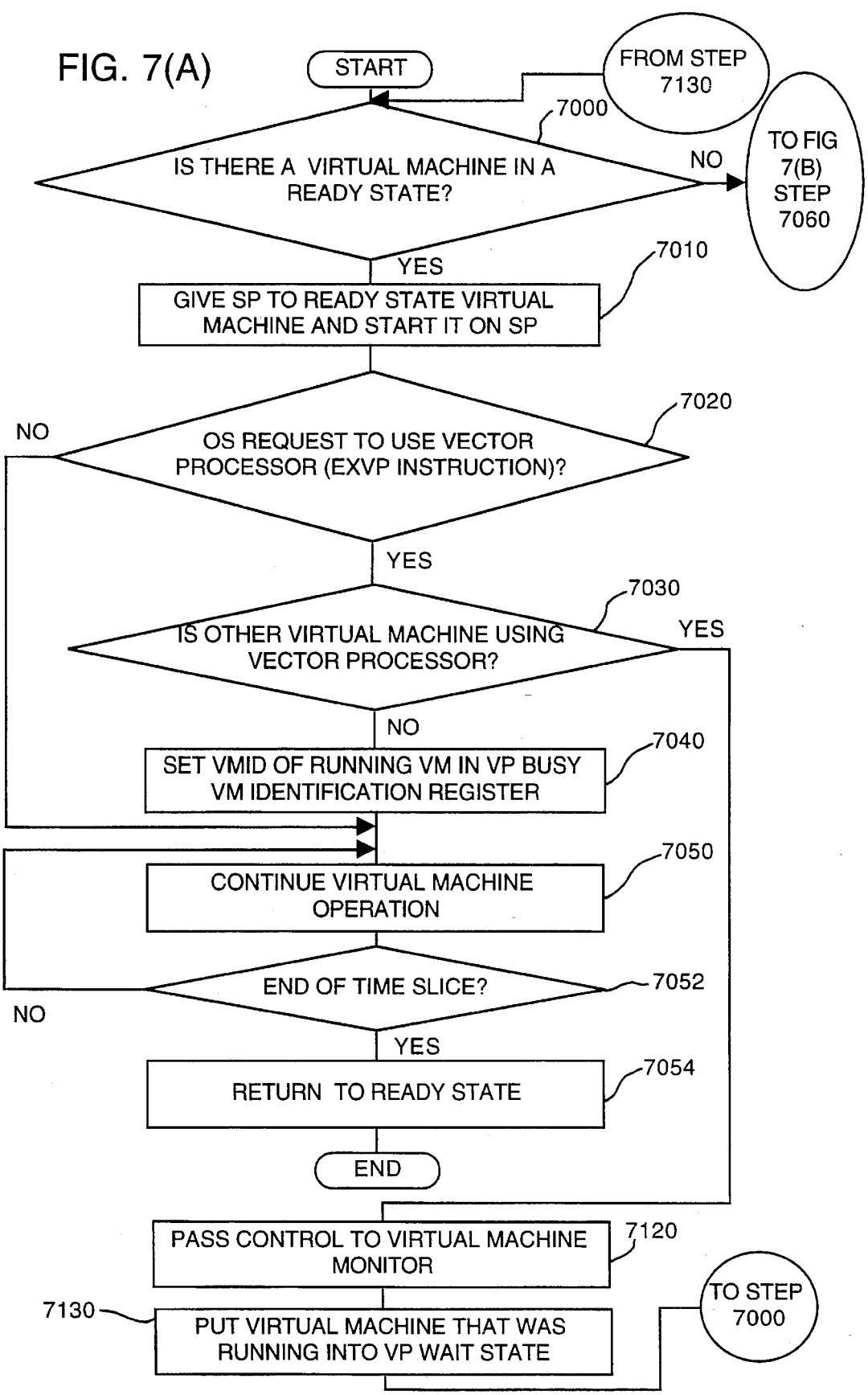
FIGS. 7(A) and 7(B) taken together are a flow chart of the scheduling method according to the second embodiment.
Figure 7B:
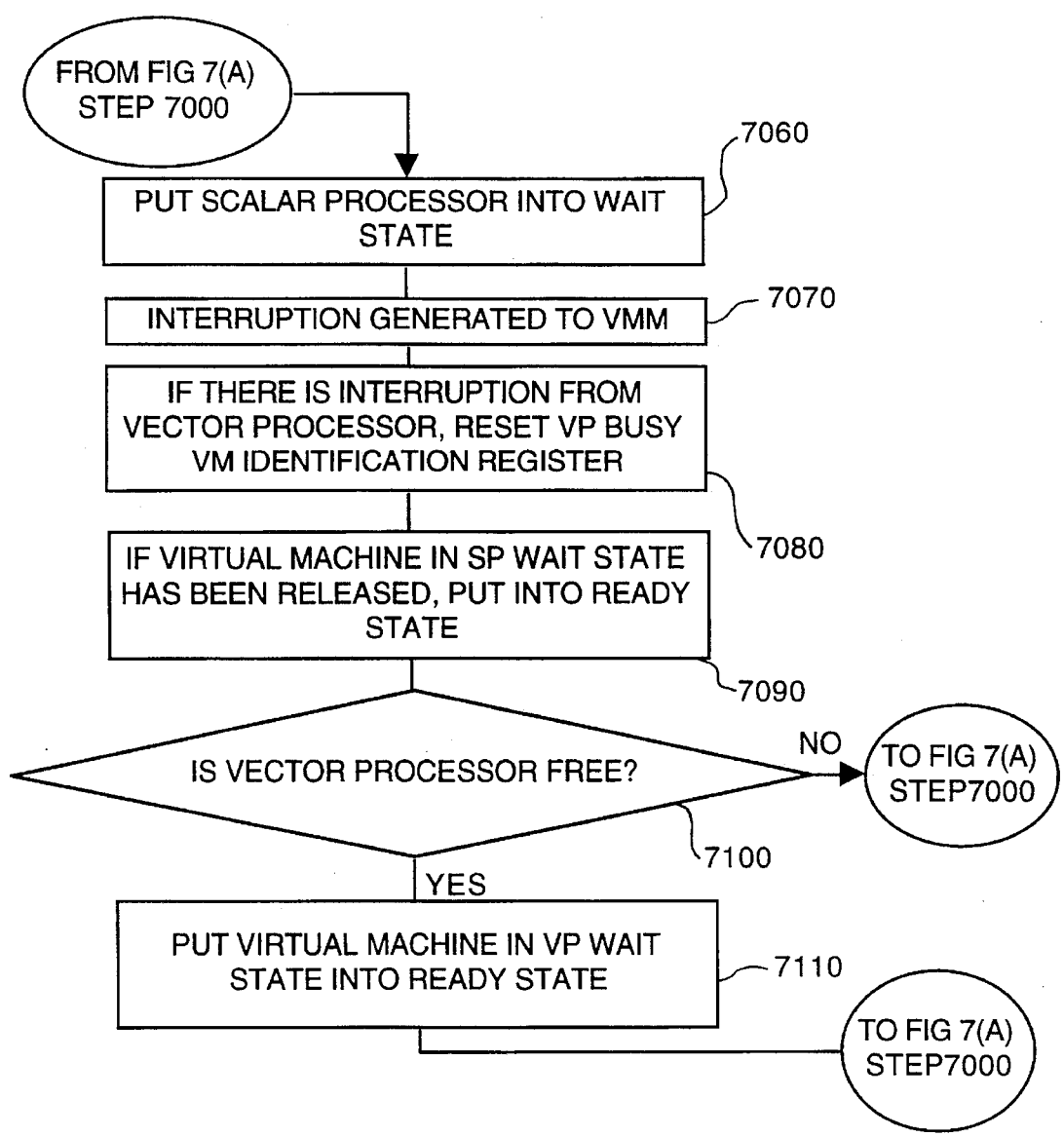

The second virtual machine scheduling method by the virtual machine monitor 410 will now be described with reference to the flow chart of FIG. 7.

The virtual machine monitor 410 first determines whether or not there is a virtual machine in a ready state (Step 7000), and if there is not puts the scalar processor 100 into a wait state (Step 7070).

If there is a virtual machine in a ready state, an SIE instruction is used to start the virtual machine running on the scalar processor 100 (Step 7010). However, the value of the VMID 415 in state description (SD) 411 is not loaded into the VP busy VM identification register 130 at the point at which the VM starts running on the scalar processor but at the point at which the operating system executes the EXVP instruction. Also, the interruption execution circuit 120 resets the VP busy VM identification register 130 at the point at which the second processor 200 completes execution of the instructions.

After this, when an operating system of a virtual machine in an execute state requests to use the second processor 200 (when an EXVP instruction is issued) (Step 7020), and it is determined whether or not another virtual machine is using the second processor 200 (Step 7030). With this determination, when the content of the VP busy VM identification register 130 is not "0" (which indicates that one of the virtual machines is using the second processor 200) and, moreover, the content of the VP busy VM identification register 130 is not the same as the content of the VMID 415 in the state description (SD) 411, it can be established that another virtual machine is using the second processor 200. If another virtual machine is not using the second processor 200, the scalar instruction execution circuit 110 sets the VMID 415 value of the virtual machine running on the scalar processor 100 in the VP busy VM identification register 130 (Step 7040), and the virtual machine continues running on scalar processor 100 (Step 7050). If a time slice ends (Step 7052), the virtual machine concerned reverts to a ready state (Step 7054).

In Step 7030, if another virtual machine is using second processor 200, the scalar instruction execution circuit 110 suspends the operation of the virtual machine and transfers control to the virtual machine monitor 410 (Step 7120). Following this, the virtual machine monitor 410 to which control has been transferred puts the virtual machine that had been running on the scalar processor 100 into a VP wait state (Step 7130), returns execution to Step 7000 and again carries out virtual machine dispatching.

In Step 7000, when there is no virtual machine in a ready state the virtual machine monitor 410 puts the scalar processor 100 into a wait state (Step 7060). Following this, when an interruption to the virtual machine monitor 410 is generated (Step 7070), if the interruption is from the second processor 200 the interruption execution circuit 120 resets the VP busy VM identification register 130 to "0" (Step 7080). Following this, when a virtual machine in an SP wait state is released by a simulation or the like of this interruption, the virtual machine monitor 410 changes the virtual machine from an SP wait state to a ready state (Step 7090). Also, the virtual machine monitor 410 uses a TVP instruction to determine whether or not the second processor 200 is in a free state (Step 7000), and if it is in a free state the virtual machine in the VP wait state is put into a ready state, process execution returns to Step 7000 and virtual machine dispatching is performed.

Thus, while with the second scheduling method, control is complex, the other processor is dispatched even when the second processor is busy and does not assume a VP wait state as long as there is no request to use the second processor, thereby improving virtual machine execution efficiency. At the point at which virtual machine running on the scalar processor 100 requests to use the second processor 200, when the other virtual machine is using the second processor 200, operation of said virtual machine on the scalar processor 100 is suspended so there is no problem with the operating system on one virtual machine executing an EXVP instruction while the second processor 200 is being used by the other virtual machine.

3.3 Third embodiment scheduling method

Figure 8:
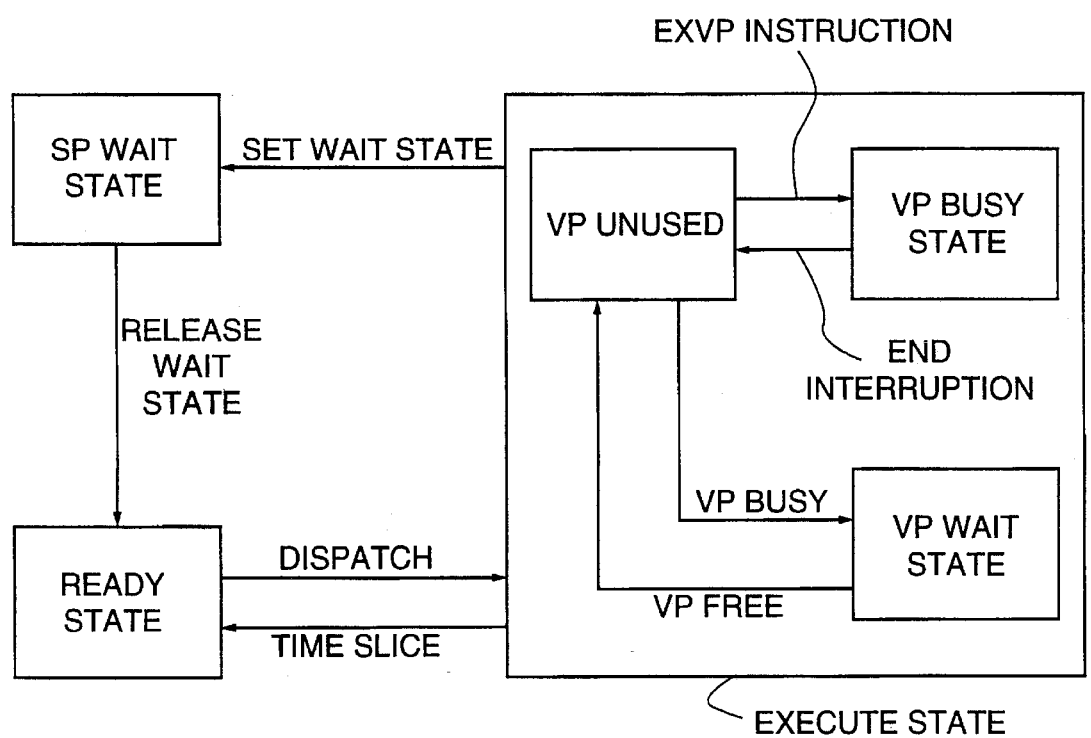
FIG. 8 is an explanatory diagram of state transitions in a scheduling method according to a third embodiment of the invention.

Virtual machine scheduling state transitions will now be described with reference to FIG. 8. In this third scheduling method, under the virtual machine monitor 410 there are three virtual machine scheduling states, which are a scalar processor wait state (SP wait state), a ready state, and an execute state. Thus, the VP wait state of the first two scheduling methods is not included. In the first two scheduling methods the VP wait state is managed by the virtual machine monitor 410 to create a computer environment in which the virtual machine operating system seems to have exclusive possession of the second processor 200, and the need for the virtual machine operating system to recognize the state of second processor 200 utilization by another virtual machine has been eliminated. In contrast, in the third scheduling method the operating system of each virtual machine manages the VP wait state and executes jobs while recognizing the state of second processor 200 utilization by another virtual machine. The third scheduling method is the same as the second with reference to the fact that a virtual machine in a ready state is changed to an execute state regardless of the utilization state of the scalar processor. However, in terms of state transitions the second and third scheduling methods have the following differences.

(a) In the second scheduling method, if at the point at which the execute state virtual machine moves to use the second processor 200 another virtual machine is using the second processor 200, the execute state is suspended and the virtual machine monitor 410 shifts the suspended virtual machine to a VP wait state. In the third scheduling method, however, if at the point at which the execute state virtual machine moves to use the second processor 200 another virtual machine is using the second processor 200, the scalar instruction execution circuit 110 communicates a VP busy state to the operating system of the execute state virtual machine. As a result, the operating system assumes a VP wait state and executes the job without using second processor 200. Also, at the point at which the second processor 200 becomes free the virtual machine monitor 410 or scalar processor 100 uses an interruption to communicate to the operating system that the second processor 200 has become free. With this interruption the operating system reverts to a VP free state, the job which uses the second processor 200 is restarted by an EXVP instruction and there is a shift to a VP busy state. An end-of-execution interruption from the second processor causes the operating system to revert to a VP free state.

Figure 9B:
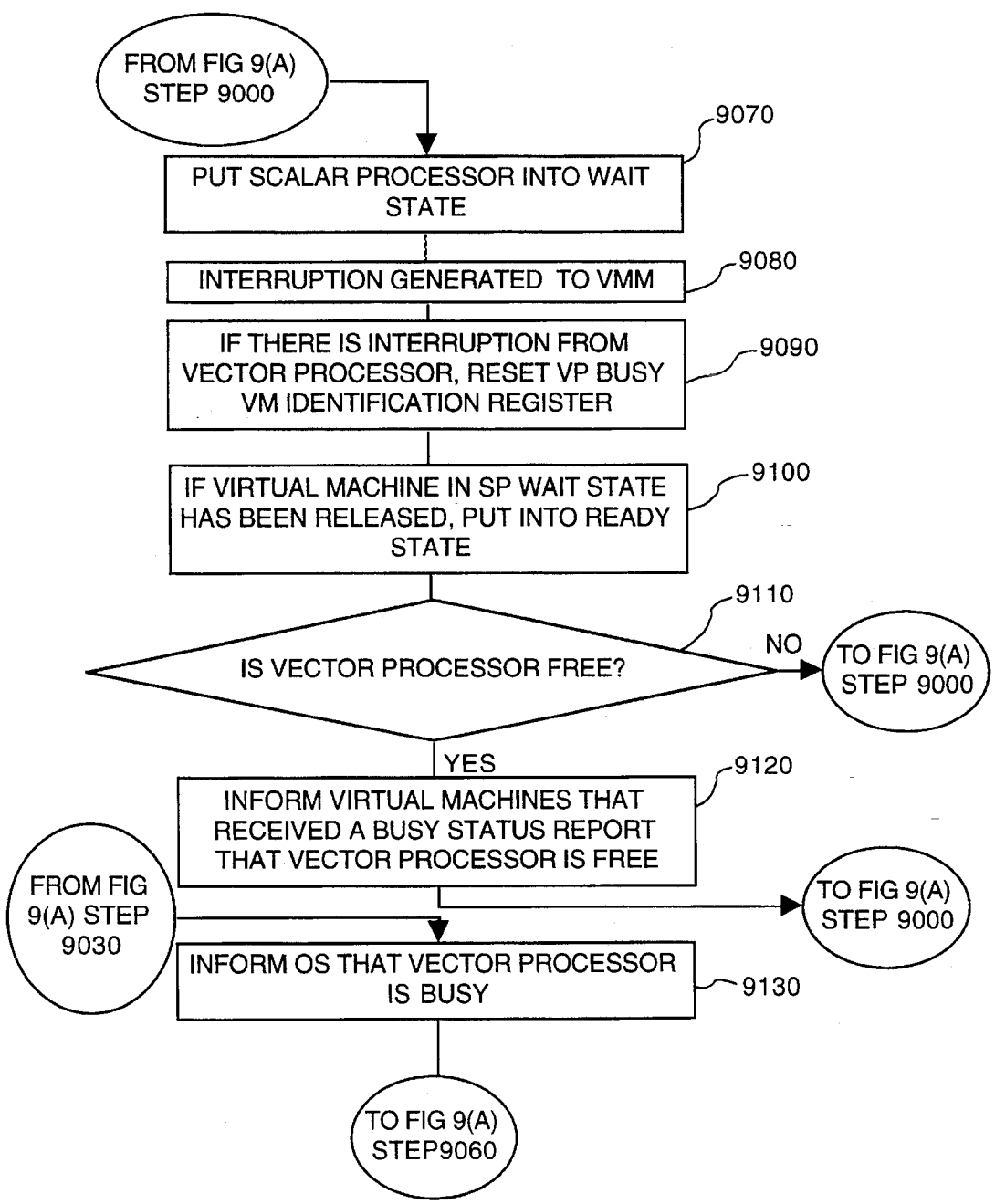

The third virtual machine scheduling method by the virtual machine monitor 410 will now be described with reference to the flow chart of FIGS. 9A and 9B.

The virtual machine monitor 410 first determines whether or not there is a virtual machine in a ready state (Step 9000), and if there is not puts the scalar processor 100 into a wait state (Step 9070).

If there is a virtual machine in a ready state, the ready state virtual machine is started on the scalar processor 100 (Step 9010). In the second scheduling method an SIE instruction is used to start the virtual machine running on the scalar processor 100. After the virtual machine has started running on the scalar processor 100, when there is a request from the operating system to use the second processor 200 (Step 9020), in the same way as in the second scheduling method, the content of VMID 415 and the VP busy VM identification register 130 are used to determine whether or not another virtual machine is using the second processor 200 (Step 9030). If it is thus determined that second processor 200 is being used by another virtual machine the information that the second processor 200 is busy is communicated to the operating system (Step 9130) and the virtual machine continues to run on scalar processor 100 (Step 9060). Also, at this point the scalar instruction execution circuit 110 sets a "1" in busy report register 131. If no other virtual machine is using the second processor 200, the content of the VMID 415 of the virtual machine that is running is set in the VP busy VM identification register 130 (Step 9040), use of second processor 200 is started (Step 9050) and the virtual machine continues running on scalar processor 100 (Step 9060). If a time slice ends (Step 9062), the virtual machine concerned returns to a ready state (Step 9064).

Following Step 9070, when an interruption to the virtual machine monitor 410 is generated (Step 9080), if the interruption is from the second processor 200 the interruption execution circuit 120 resets the VP busy VM identification register 130 to "0" (Step 9090). When a virtual machine SP wait state is released by simulating this interruption, the virtual machine is shifted from an SP wait state to a ready state (Step 9100). The virtual machine monitor 410 also determines whether or not the second processor 200 has been freed (Step 9110), and if it has, the fact that the second processor 200 is free is communicated to all virtual machines which were sent a busy signal; that is, an interruption is used to communicate this to virtual machines in which in the state description 411 the busy report bit 414 is "1" (Step 9120). After dispatching, the operating system that has been informed that the second processor 200 is free re-starts jobs that use the processor.

As described above the virtual machine monitor 410 can execute the free interruption by simulation, but execution is also possible without the intervention of the virtual machine monitor 410. In this case, with reference to FIG. 5, the value in VP busy VM identification register 130 and the value in register 132, which is always "0", are compared by comparator 133. If the value in VP busy VM identification register 130 is "0", meaning that second processor 200 is not busy, the output of the comparator 133 goes to "1", and the logical product (AND) of this output and the value of the busy report register 131 is obtained by an AND circuit 134. When the AND circuit 134 output is "1" a free interruption request signal 181 is sent to the interruption execution circuit 120. When the free interruption request signal 181 is "1", the interruption execution circuit 120 generates an interruption at a point at which the operating system that is running can be interrupted and the busy report register 131 is reset to "1".

Thus, as in accordance with each of the above three scheduling methods a virtual machine scheduling method can be provided that enables multiple virtual machine operating systems to share the second processor 200.

4. Processing of execution termination interruption by second processor

The processing of execution termination interruptions by the second processor 200 will now be described with reference to FIG. 5.

When execution by the second processor 200 ends, an interruption signal 160 and an interruption source VMID 170, which identifies the virtual machine that used the second processor 200, are sent to the scalar processor 100. In this embodiment, the interruption holding register 180 holds the interruption for the corresponding virtual machine; bit n indicates the presence or absence of an interruption held for virtual machine VMID=n. When the interruption signal 160 is sent from the second processor 200 the interruption hold register 180 bit corresponding to the interruption source VMID 170 is set to "1" and the interruption is held until the said virtual machine is running on the scalar processor 100.

Of the multiple bits of the interruption hold register 180, bit value 165 corresponding to the VMID 415 of the virtual machine running on the scalar processor 100 is sent to the interruption execution circuit 120. Thus, when the bit value 165 input to the interruption execution circuit 120 is "1", the interruption accompanying the termination of execution by the second processor 200 is held by the operating system that is in operation. Therefore, if the bit value 165 is "1" and the virtual machine running on the scalar processor 100 can be interrupted, the interruption execution circuit 120 executes an interruption of that operating system. After execution of the interruption, the interruption execution circuit 120 outputs a reset signal 190 to the hold register 180. As a result, the interruption hold register 180 bit corresponding to the virtual machine that is running is reset to "0".

Thus, in accordance with this embodiment the end-of-execution interruption can be executed directly on the operating system of the virtual machine that activated the second processor, without the intervention of the virtual machine monitor. This therefore enables the overhead of the virtual machine monitor intervention to be reduced.

While in the above embodiment there are two virtual machines, VM-1 and VM-2, it will be clear that there could just as well be three or more virtual machines.

Moreover, the supercomputer to which the description relates has one scalar processor 100 and one second processor 200. However, the present invention can also be applied to a supercomputer having a multiprocessor configuration consisting of multiple pairs of the scalar processor 100 and second processor 200. Furthermore, the present invention is applicable not only to supercomputers but also to computers having a similar configuration thereto.

In accordance with the present invention, a virtual machine scheduling method can be provided that enables multiple virtual machine operating systems to share a second processor. Also, because the end-of-execution interruption can be executed directly on the operating system of the virtual machine that activated the second processor without the intervention of the virtual machine monitor, the overhead of the virtual machine monitor intervention can be reduced. In addition, the provision of an address translation circuit in the second processor enables multiple virtual machines having an arbitrary continuous region in main storage to use the second processor.

We claim:

1. A virtual machine control method for a computer on which a plurality of operating systems are available to be run on virtual machines under control of a virtual machine monitor running on the computer, said computer having scalar and vector processors wherein the vector processor starts executing vector processor instructions in accordance with an execution instruction which the scalar processor sends to the vector processor in response to an execute vector processor instruction issued by an operating system whereby a virtual machine to which the operating system is assigned uses the vector processor, said method executed by the virtual machine monitor comprising the steps of:

selecting one of the operating systems for running on the computer;

determining whether any of the virtual machines other than a virtual machine to which the selected operating system is assigned is using the vector processor;

suspending the running of the selected operating system on the scalar processor when it is determined that one of the other virtual machines is using the vector processor; and dispatching the scalar processor for exclusive use by the selected operating system when it is determined that none of the other virtual machines is using the vector processor.

2. A virtual machine control method according to claim 1, wherein in said determining step, the virtual machine monitor executes a test vector processor instruction to determine if any of the other virtual machines is using the vector processor.

3. A virtual machine control method according to claim 1, further comprising the step of executing said selecting step again when an externally supplied interruption is received by the virtual machine monitor.

4. A virtual machine control method according to claim 1, wherein in said selecting the virtual machine monitor checks whether any of the operating systems is in a ready state and selects an operating system in a ready state as the selected operating system.

5. A virtual machine control method according to claim 1, wherein each of the virtual machines has a use attribute indicating whether the virtual machine will ever use the vector processor, and said selecting step includes a step of checking the use attribute of the virtual machine to which the selected operating system is assigned to determine if use of the vector processor is required.

6. A virtual machine control method according to claim 5, wherein in said selecting step, if it is determined that the virtual machine to which the selected operating system is assigned does not require use of the vector processor, the virtual machine monitor dispatches the scalar processor to the selected operating system.

7. A virtual machine control method according to claim 1, including the step of communicating an end-of-execution instruction from said vector processor to said scalar processor upon termination of execution of the vector instructions by said vector processor after executing the suspending step.

8. A virtual machine control method according to claim 4, wherein following said dispatching said selected operating system is in an execute state until a predetermined time interval elapses whereupon the selected operating system is put in the ready state by the virtual machine monitor.

9. A virtual machine control method for a computer on which a plurality of operating systems are available to be run on virtual machines under control of a virtual machine monitor running on the computer, said computer having scalar and vector processors wherein the vector processor starts executing vector processor instructions in accordance with an execution instruction which the scalar processor sends to the vector processor in response to an execute vector processor instruction issued by an operating system whereby a virtual machine to which the operating system is assigned uses the vector processor, said method executed by the virtual machine monitor comprising the steps of:

selecting one of the operating systems for running on the computer and dispatching the scalar processor to the selected operating system;

in response to the selected operating system running on the scalar processor requesting the use of the vector processor, determining whether any of the virtual machines other than the virtual machine to which the selected operating system is assigned is using the vector processor;

suspending the running of the selected operating system on the scalar processor when it is determined that one of the other virtual machines is using the vector processor; and continuing the running of the selected operating system on the scalar processor when it is determined that none of the other virtual machines is using the vector processor whereupon the virtual machine to which the selected operating system is assigned starts to use the vector processor.

10. A virtual machine control method according to claim 9, further comprising assigning each of said virtual machines with virtual machine identification data (VMID); and storing a VMID of the virtual machine to which the selected operating system is assigned in a SP busy VMID register in response to dispatching the scalar processor to the selected operating system.

11. A virtual machine control method according to claim 10, further comprising loading virtual machine identification data (VMID) of the virtual machine to which the selected operating system is assigned in a VP busy VM identification register of the scalar processor for identifying the virtual machine using the vector processor in response to the starting of the use of the vector processor by the virtual machine.

12. A virtual machine control method according to claim 11, wherein in said determining step includes the step of checking a mismatch of the contents of the VP busy VM identification register and the SP busy VMID register to determine if any of the other virtual machines is using the vector processor.

13. A virtual machine control method according to claim 9, further comprising the steps of executing said selecting step again when an externally supplied interruption is received by the virtual machine monitor.

14. A virtual machine control method according to claim 9, wherein in said selecting the virtual machine monitor checks whether any of the operating systems is in a ready state and selects an operating system in a ready state as the selected operating system.

15. A virtual machine control method according to claim 9, including the step of communicating an end-of-execution instruction from said vector processor to said scalar processor upon termination of execution of the vector processor instructions by said vector processor after executing the suspending step.

16. A virtual machine control method according to claim 14, wherein following said dispatching said selected operating system is in an execute state until a predetermined time period elapses whereupon the selected operating system is put in the ready state by the virtual machine monitor.

17. A virtual machine control method for a computer on which a plurality of operating systems are available to be run on virtual machines under control of a virtual machine monitor running on the computer, said computer having scalar and vector processors wherein the vector processor starts executing vector processor instructions in accordance with an execution instruction which the scalar processor sends to the vector processor in response to an execute vector processor instruction issued by an operating system whereby a virtual machine to which the operating system is assigned uses the vector processor, comprising the steps of:

selecting one of the operating systems by the virtual machine monitor for running on the computer and dispatching the scalar processor to the selected operating system;

in response to the selected operating system running on the scalar processor requesting use of the vector processor, communicating with the scalar processor to the selected operating system whether any of the virtual machines other than the virtual machine to which the selected operating system is assigned is using the vector processor;

suspending, by the selected operating system, the use of the vector processor by the virtual machine to which the selected operating system is assigned when it is communicated that one of the other virtual machines is using the vector processor whereupon the virtual machine to which the selected operating system is assigned uses only the scalar processor; and continuing the running of the scalar processor by the selected operating system that requests use of the vector processor when it is communicated that none of the other operating systems is using the vector processor whereupon the virtual machine to which the selected operating system is assigned starts to use the vector processor.

18. A virtual machine control method according to claim 17, further comprising assigning each of said virtual machines with virtual machine identification data (VMID); and storing a VMID of the virtual machine to which the selected operating system is assigned in a SP busy VMID register in response to dispatching the scalar processor to the selected operating system.

19. A virtual machine control method according to claim 18, further comprising loading said VMID of the virtual machine to which the selected operating system is assigned in a VP busy VM identification register of the scalar processor for identifying the virtual machine using the vector processor in response to the starting of the use of the vector processor by the virtual machine.

20. A virtual machine control method according to claim 19, wherein in said determining step includes the step of checking a mismatch of the contents of the VP busy VM identification register and the SP busy VMID register to determine if any of the other virtual machines is using the vector processor.

21. A virtual machine control method according to claim 17, wherein in said selecting by the virtual machine monitor checks whether any of the operating systems is in a ready state and selects an operating system in a ready state as the selected operating system.

22. A virtual machine control method according to claim 17, further including the step of notifying an end-of-execution instruction from said vector processor to said scalar processor upon termination of execution of the vector instructions by said vector processor after executing the suspending step.

23. A virtual machine control method according to claim 21, wherein following said dispatching said selected operating system is in an execute state until a predetermined time interval elapses whereupon the selected operating system is put in the ready state by the virtual machine monitor.

24. A virtual machine control method according to claim 19, wherein an interruption execution circuit clears said VMID of the virtual machine to which the selected operating system is assigned that is stored in the VP BUSY VM identification register when the vector processor completes execution of the vector processor instructions.

25. A virtual machine control method according to claim 17, wherein said communicating includes setting a busy report bit for indicating that the selected operating system has been communicated a busy status of the vector processor in a busy report register of the scalar processor when it is determined that one of the other virtual machines is using the vector processor.

26. A virtual machine control method according to claim 25, further comprising the steps of:

generating, by the Vector processor, an interruption to the scalar processor in response to termination of execution of the vector processor instructions; and executing, by the scalar processor, the interruption to all operating systems, which have been communicated the busy status to communicate that the vector processor is free and to reset the VP busy VM identification register to zero.

27. A virtual machine control method according to claim 17 further comprising the steps of:

generating, by the vector processor, an interruption to the scalar processor in response to termination of execution of the vector processor instructions; and executing, by the scalar processor, the interruption to all operating systems, which have been communicated a busy status.

28. A memory access method for a computer on which a plurality of operating systems are available to be run on virtual machines under control of a virtual machine monitor running on the computer, said computer having scalar and vector processors wherein the vector processor starts executing vector processor instructions in accordance with an execution instruction which the scalar processor sends to the vector processor in response to an execute vector processor instruction issued by an operating system whereby a virtual machine to which the operating system is assigned uses the vector processor, comprising the steps of:

registering, by said virtual machine monitor, main memory address mapping information in said vector processor for translating a logical address designated by vector instructions in virtual memory space to absolute main computer storage for each of the virtual machines on the basis of virtual machine identification data for identifying each of the virtual machines;

communicating from the scalar processor to the vector processor the virtual machine identification data of a virtual machine for an operating system being run on the scalar processor;

selecting the main memory mapping information on the basis of the virtual machine identification data communicated from the scalar processor when the vector processor requests access to the main memory of the computer;

translating the main memory address of the operating system for which access from the vector processor has been requested to a corresponding main storage address using the selected memory address mapping information; and using the address resulting from the translation to access the computer main storage.

29. A virtual machine control system for a computer having scalar and vector processors, wherein the vector processor starts executing vector processor instructions in accordance with an execution instruction from the scalar processor, comprising:

a virtual machine monitor running on the computer for controlling the running of a plurality of virtual machines on the computer so that a plurality of operating systems are available to be run on the computer, each of the virtual machines having one of said operating systems with and a virtual machine identification data for identifying each virtual machine;

said scalar processor having means for sending virtual machine identification data of a virtual machine for an operating system running on the scalar processor to the vector processor;

said vector processor having a vector instruction execution unit and an address translation unit, which includes address mapping information having start addresses and end addresses of main storage assigned to each of the virtual machines and means for selecting address mapping information on the basis of the virtual machine identification data received from said scalar processor, for translating a logical address designated by vector instructions in virtual memory to an absolute address in the main storage on the basis of the selected address mapping information; and said virtual machine monitor having means for selecting one of the operating systems and dispatching of the vector processor to the selected operating system.

30. A virtual machine control system according to claim 29, wherein said scalar processor sends the virtual machine identification data when the scalar processor executes a vector processor execution instruction to activate the vector processor for the virtual machine to which the selected operating system is assigned, said address translation unit selecting a starting address and an end address in main storage that is assigned to a virtual machine identified by the virtual machine identification data received from the scalar processor for executing the vector instructions.

31. A virtual machine control system according to claim 30, said address translation unit having means for comparing an absolute address in virtual memory with the end address and executing an interruption signal to the vector processor when the absolute address in virtual memory is outside the main storage for the virtual machine.

32. A virtual machine control system according to claim 29, wherein the virtual machine monitor determines, when a virtual machine to which the selected operating system is assigned requires use of the vector processor, whether any of the virtual machines other than the virtual machine to which the selected operating system is assigned is using the vector processor, and said virtual machine monitor suspends the running of the selected operating system when the virtual machine to which the selected operating system is assigned requires use of the vector processor and it is determined that one of the other virtual machines is using the vector processor; and said virtual machine monitor dispatches the scalar processor for exclusive use by the selected operating system when it is determined that none of the other virtual machines is using the vector processor.

33. A virtual machine control method according to claim 29, wherein said scalar processor includes a busy report register connected with the scalar instruction execution unit in which a busy report bit is set when a virtual machine requests use of the vector processor and the vector processor is busy.

* * * * *